Patented Mar. 18, 1947

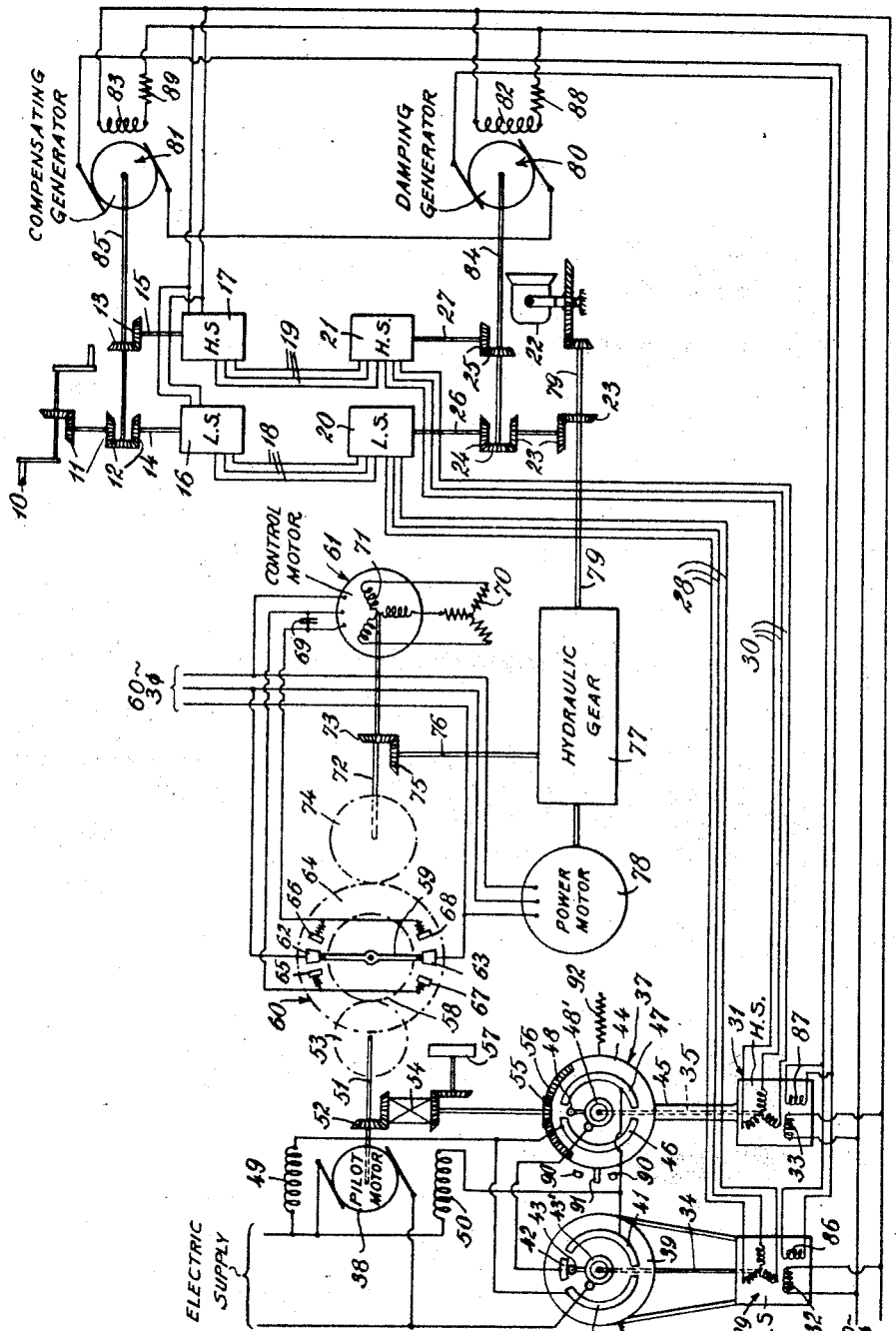

2,417,588

UNITED STATES PATENT OFFICE 2,417,588

REMOTE CONTROL SYSTEM

Arthur P. Davis, Stamford, Conn., and George Agins, Brooklyn, N. Y., assignors to Arma Corporation, a corporation of New York Application July 1, 1938, Serial No. 216,924

14 Claims. (Cl. 172—239)

This invention relates to control systems and has particular reference to follow-up control systems in which a local or remote controlled element may be instantaneously driven at a rate of speed and through a distance or angle corresponding to the rate and extent of movement of a controlling element.

The follow-up systems in general use, especially those adapted for heavy duty work, are complicated and expensive and where a relatively high degree of accuracy is required, the sensitivity necessary to gain such accuracy is accompanied by objectionable hunting of the controlled element. Such systems usually employ sensitive but delicate electronic valve arrangements which are likely to get out of order. All of the advantages of electronic follow-up control systems are realized in the system of the present invention while eliminating their disadvantages, to the end that a rugged, non-hunting system is provided, which is readily adaptable to various uses where it is desired to accurately and rapidly position one or more light or heavy controlled elements in accordance with the movements of a local or remote controlling element.

The control system of the present invention includes a reversing switching mechanism, one member of which is driven by a reversible pilot motor controlled jointly by the controlling and controlled elements, and the other member of which is operatively connected to a control motor controlled by the reversing switching mechanism. The control motor also controls a variable speed hydraulic gear which drives the controlled element. The controlled element accordingly instantaneously responds to all movements of the controlling element, and means are provided for effecting differential velocity damping of the movements of the controlled element. Means are also provided to correct any irregularities in response of the system, and to compensate for the velocity lag of the variable speed hydraulic gear.

It will be seen that in the control system of the present invention, the speed and acceleration of the control motor are governed by the frequency of the intermittent contact action of the reversing switching mechanism, and by the ratio of the time during which the contacts are engaged compared to the time during which the contacts are broken.

For a more complete understanding of the invention, reference may be had to the accompanying drawing, in which a preferred embodiment of the remote control system of this invention is illustrated schematically and diagrammatically.

In this drawing, numeral 10 designates the controlling element, located at a local or remote station with respect to the controlled element 22. The controlled element 22 may be any load, such as the searchlight shown, or a valve, gate, etc. The controlling element 10 may consist of the handwheels 10 connected to the gearing 11, 12, 13, which drives the rotor shaft extensions 14 and 15, and thereby the rotors of the low speed and high speed rotary induction transmitters 16 and 17 of a self-synchronous transmission system. The electrical output of each transmitter 16 and 17 is supplied through the corresponding wiring 18 and 19, as an electrical input to its respective low speed and high speed differential transmitter 20 and 21. The rotors of the differential transmitters 20 and 21, are driven by the controlled element 22, by means of gearing 23, 24, 25, and shaft extensions 26 and 27 on the rotors of respective transmitters 20 and 21.

The electrical output of low speed differential transmitter 20 is supplied through the wiring 28 to the input of low speed self-synchronous rotary induction receiver 29, and the electrical output of high speed differential transmitter 21 is supplied through the wiring 30 to the input of high speed self-synchronous rotary induction receiver 31. The field windings of controlling transmitters 16 and 17, and the main field windings 32 and 33 of respective low and high speed receivers 29 and 31, are energized from the single phase alternating current supply. With zero voltage applied to the auxiliary field windings 86 and 87 of respective receivers 29 and 31, the angular displacement of the corresponding rotor shaft extensions 34 and 35 will be proportional to the relative angular deviation between the controlling element 10 and controlled element 22. The effect produced in the receivers 29 and 31 by the energization of the auxiliary field windings 85 and 87 will be described later.

The two receivers 29 and 31 are equipped with respective contact heads 36 and 37, which jointly control the operation of suitable pilot motor 38. Low speed or coarse control contact head 36 consists of a disc of insulating material 39, which is rigidly secured to the stationary frame of low speed receiver 29 as shown. Two long contact segments 40, 41, and one short contact segment 42 between the adjacent ends of the long contacts, are mounted on the disc 39. A contact roller or trolley 43 is arranged to engage the contact segments 40, 41, 42 and is electrically connected to and carried by slip ring 43'. The slip ring 43' is secured to and electrically insulated from the shaft extension 34 of receiver 29, which is journalled through the center of the stationary insulated disc 39 for rotation by low speed or coarse receiver 29.

The high speed or fine control contact head 37 consists of a disc 44 of insulating material journalled on the end of a sleeve 45 mounted coaxially with rotor shaft extension 35, to the frame of high speed receiver 31. The disc 44 carries two contact segments 46 and 47 adapted to be engaged by a contact roller or trolley 48 electrically connected to and carried by a slip ring 48' secured to and electrically insulated from the shaft extension 35 of high speed or fine receiver 31. Shaft extension 35 is journalled in sleeve 45 and through the center of insulated disc 44 for rotation by high speed receiver 31.

Pilot motor 38 is of the reversible type supplied from the indicated electric supply and has two independent field windings 49, 50. The energization of one field winding will result in rotation of the pilot motor 38 in a clockwise direction, and the energization of the other field winding will result in rotation of the pilot motor 38 in a counterclockwise direction. The selection of field winding, either 49 or 50 is under the control of the contact heads 36 and 37, winding 50 being connected to segments 41 and 47 of contact heads 36 and 37, respectively, and winding 49 being connected to segments 40 and 46 of contact heads 36 and 37, respectively, as shown. Also as shown, segment 42 of contact head 36 is connected to slip ring 48' of contact head 37, and slip ring 43' of contact head 36 is connected to electric supply.

Pilot motor 38 drives shaft 51 upon which are mounted the two gears 52 and 53. Gear 52 drives the input of a mechanical differential 54, one output of which drives gear 55 meshing with a gear sector 56 mounted on the rotatable disc 44 of high speed contact head 37.

Fixed stops 90 and cooperating pin 91 on disc 44 are provided to limit the angular displacement of the disc 44, and a restraining or centering spring 92 is provided to restore the disc 44 when displaced, to its central position. The other output of the differential 54 drives inertia type damper 57, which may be of any well known type.

Gear 53 on pilot motor shaft 51 drives gear 58 which carries contact arm 59 of reversing switching mechanism 60. Damping means, not shown, but preferably of the type illustrated and described in copending application Serial No. 115,488, filed December 12, 1936, are included in the reversing switching mechanism between gear 58 and contact arm 59. The reversing switching mechanism 60, also described in greater detail in said copending application, controls the magnitude and direction of the torque produced by wound rotor induction type control motor 61. Two contacts 62 and 63 are secured to and insulated from contact arm 59, with each contact at its respective extremity of the arm. Gear 64, coaxially mounted with gear 58, is free to turn independently of the latter, being driven by gear 74 mounted on shaft 72 of the rotor 71 of control motor 61. Gear 64 carries two contacts, 65 and 66, adapted to cooperate with contact 62 of arm 59, and two other contacts 67 and 68, adapted to cooperate with contact 63 of arm 59. The contacts 65 to 68, inclusive, are insulated from gear 64 and from each other, as by being mounted on an insulating disc or plate.

The four contacts 65, 66, 67 and 68, are adjustable, and are so adjusted that when contact 62 is centrally positioned between cooperating contacts 65 and 66, a smaller air gap is provided between contact 62 and contacts 65, 66, than between contact 63 and its cooperating contacts 67, 68, as shown. The contacts 65 to 68 are spring mounted, preferably in the manner shown in said application, so that when contact 62 engages contact 65, for example, and the torque of the pilot motor 38 produces additional rotation of the contact arm 59, the spring contact 65 will be compressed sufficiently to allow contact 63 to engage contact 68. Similarly, if the pilot motor is rotating in the opposite direction with equal torque, contact 62 will engage contact 66, and then contact 63 will engage contact 67. This contact spacing directly provides two steps of acceleration for the polyphase control motor 61. Condenser 69, which is electrically connected across two of the terminals of the stator or primary windings of control motor 61, is provided to effect split phase operation of the motor 61 for the condition where contact 62 is engaging either contact 65 or contact 66, and contact 63 is not engaging either contact 68 or contact 67. Resistors 70 are electrically connected in Y-relation to the secondary or rotor winding 71 of the control motor 61 in accordance with the desired torque requirements of the motor.

The control motor 61 also is connected by its shaft 72 and gears 73 and 75 to the control shaft 76 of the variable speed hydraulic gear 77. The variable speed hydraulic gear 77 is of the well known type in which the output speed varies directly as the control shaft 76 displacement, and in which the direction of rotation of the output shaft 79 is determined by the direction of the angular displacement of the control shaft 76 from the neutral position. The polyphase power motor 78 drives the variable speed hydraulic gear 77, and the output shaft 79 of the hydraulic gear 77 drives the controlled element 22 and the rotors of the differential transmitters 20 and 21.

A damping generator 80 is connected to the controlled element 22 by means of shaft 84, and a compensating generator 81 is connected to the controlling element 10 by means of shaft 85. The output circuits of the two generators 80 and 81 are electrically connected in opposed series to each other, and to the auxiliary field windings 86 and 87 of respective low and high speed receivers 29 and 31.

The damping generator 80 is provided to damp the movements of the controlled element 22, and the compensating generator 81 is provided to compensate for the velocity lag error of the control system and variable speed hydraulic gear 77. The two generators, 80 and 81, are similar, and preferably are of the alternating current commutator type, in which the field windings 82 and 83 are energized from the alternating current electric supply, and the generated alternating current voltage is proportional to the angular velocity of the corresponding generator rotor.

Now referring to the auxiliary field windings 86 and 87 of the respective low and high speed receivers 29 and 31, these windings are positioned in space quadrature relation with the respective main field windings 32 and 33 of the corresponding receivers 29 and 31. Inasmuch as the field windings 82 and 83 of respective generators 80 and 81 are each connected in series with a corresponding phase shifting resistor 88 and 89, and to the same single phase electric supply that energizes the main field windings 32 and 33 of the receivers 29 and 31, it follows that the electric currents in the main 32, 33 and auxiliary field windings 86, 87 of the respective receivers 29 and 31 will be in time phase relation with each other.

In the operation of the control system of this invention, and assuming that it is in its normal de-energized condition with the controlled element 22 in positional agreement with the controlling element 10, rotation of the controlling element 10 will be transmitted through gearing 11, 12, and 13 to the rotors of the low and high speed transmitters 16 and 17. The resulting rotation of the rotors will change the voltages which are induced in the secondary windings of transmitters 16 and 17 by an amount determined by the angular positions of the rotors, and these changed voltages are impressed on the primary windings of the respective differential transmitters 20 and 21. The secondary voltages induced in the differential transmitters 20 and 21 change a corresponding amount, and these voltages are impressed on the secondary windings of respective receivers 29 and 31, so that with the controlled element 22 at rest, the rotors of receivers 29 and 31 would respond and rotate substantially simultaneously in positional agreement with the respective rotors of the transmitters 16 and 17, if it were not for the voltage developed by compensating generator 81 operated by controlling element 10, which voltage tends to turn the rotors of the receivers 29 and 31 through a small additional angle in the same direction.

Contact trolley 48 of high speed contact head 37 will accordingly be displaced to engage contact segment 46 or 47, depending upon the direction of rotation of the controlling element 10, and thereby energize either field winding 49 or 50 of pilot motor 38. The resulting rotation of the pilot motor 38 will drive gear 52 and connected mechanical differential 54, and as the connected inertia type damper 57 is at rest, it acts as a fulcrum and allows the differential output gear 55 to rotate the disc 44 of high speed contact head 37 with the attached contact segments 46 and 47, in the same direction as the previous displacement of the contact trolley 48. This tends to disengage the contact segment 46 or 47 as the case may be, from the contact trolley 48 and this action in turn tends to eliminate the hunting due to mechanical lags in the variable speed hydraulic gear 77 and its associated equipment, by anticipating the restoration of the rotors of receivers 29 and 31 and the respective attached contact trolleys 43 and 48 to their neutral positions. When the motion of disc 44 of contact head 37 is limited by the engagement of pin 91 with either stop 90, the damper 57 then becomes ineffective to hold the mechanical differential 54, and the latter will drive damper 57.

The rotation of pilot motor 38 also results in rotation of gear 53 whose movement will be transmitted through gear 58 to the damping means included in the reversing switching mechanism 60, and from this damping means to the contact arm 59 carried by gear 58. Depending upon the direction of rotation of the controlling element 10, the contact 62 of contact arm 59 will engage its cooperating contact, either 65 or 66, which will effect split phase energization of the primary windings of control motor 61. If split phase operation does not result in sufficient torque to allow the control motor 61 to follow rapid movements of the pilot motor 38, then contact 63 of contact arm 59 of the reversing switching mechanism 60 will engage its cooperating contact, either 68 or 67, and thereby supply full phase energization to the primary winding of control motor 61 to rotate the same.

The operation of control motor 61 drives gear 73, which through gear 75, drives the control shaft 76 of the variable speed hydraulic gear 77, in the direction determined by the direction of rotation of the controlling element 10. Rotation of the control shaft 76 from the zero speed position, will cause the output shaft 79 of the variable speed hydraulic gear to drive the controlled element 22. It will be understood that at zero position of control shaft 76, the main power motor 78 merely supplies a small mechanical input to overcome the losses in the variable speed hydraulic gear 77.

Rotation of control motor 61 also causes gear 74 to drive gear 64 of reversing switching mechanism 60, with the attached contacts 65 to 68, in the same direction that gear 58 is being driven by the pilot motor 38. When the gear 64 has turned through the same angle as contact arm 59, the contacts of the reversing switching mechanism 60 will have returned to the disengaged position, so that, in effect, control motor 61 tends to de-energize itself by disengaging the cooperating contacts of the reversing switching mechanism 60. It will be understood that the torque of control motor 61 is determined by the intermittent contact action of the reversing switching mechanism 60, and by the ratio of the time during which the cooperating contacts thereof are in engagement, compared to the time during which the contacts are disengaged.

The controlled element 22 will accelerate until it is rotating in positional agreement with and at the same relative angular velocity as the controlling element 10. The relative angular deviation between the controlling and controlled elements will then be zero, and the differential velocity of the controlling and controlled elements will also be zero, so that the rotors of the receivers 29, 31, will be at rest along with the pilot motor 38, reversing switching mechanism 60, and the control motor 61, while the variable speed hydraulic gear 77 will continue to drive the controlled element 22. Any increase or decrease in the angular velocity of the controlling element 10 will necessitate a change in the control shaft 76 setting of the variable speed hydraulic gear 77, and this change is accomplished automatically in a manner previously described.

If, due to failure of the electric supply to the pilot motor 38 or other causes, the pilot motor is unable to follow rapid movements of the controlling element 10, and the controlling and controlled elements become displaced more than a permissible amount, trolley 43 of low speed contact head 36 will have been advanced to a point where it no longer makes contact with short contact segment 42, and will thereby disconnect trolley 48 of high speed contact head 37 from the circuit, so that the high speed contact head will be deprived of control, and control will be assumed by low speed contact head 36. When angular correspondence between controlled element 22 and controlling element 10 is again approximated, trolley 43 will again move into engagement with short contact segment 42, so as to restore control to high speed contact head 37.

When the controlling and controlled elements are rotating at the same relative velocity, the generated voltages of both generators 80 and 81 will be equal to each other, but as the generators are connected so that the generated voltages oppose each other, the resultant voltage which is applied to the auxiliary field windings 86 and 87 of the receivers 29 and 31 will be zero, and therefore under this condition the primary fields of the receivers will not be affected by the operation of the two generators 80 and 81.

Whenever the relative velocity of the controlled element 22 differs from that of the controlling element 10, the resultant of the generated voltages of the two generators 80 and 81, which is applied to the auxiliary field windings 86 and 87 of the receivers 29 and 31, will be proportional to the differential velocity of the controlling and controlled elements, and the primary fields of the receivers 29 and 31 will thereby be shifted through an angle whose tangent is proportional to the differential velocity of the controlling and controlled elements, and in a direction which is determined by the phase of the resultant voltage. The resulting corrective displacement of the receivers 29 and 31 rotors will always be in the direction which tends to cause the control system to drive the controlled element 22 at the same relative angular velocity as that of the controlling element 10. It is to be noted that for the relatively small angles involved, the angle of primary field shift is approximately proportional to the tangent of said angle. The rotors of the receivers 29 and 31 will therefore be advanced or retarded, depending upon the phase of the resultant voltage, through small angles which are proportional to the differential velocity of the elements. This will initiate a corrective displacement of the contact trolleys 43 and 48 of respective contact heads 36 and 37, so that differential velocity damping of the movements of the controlled element 22 is obtained.

It will be seen that the present invention provides a simple, rugged and efficient system for reproducing the movements of any controlling element such as a handwheel shown, or lever, instrument, and the like, or for adjusting a local or remote controlled element in accordance with impulses developed by photoelectric devices, thermostats, valves, floats, air or fluid flow meters and apparatus, and the like, as will be readily understood. It is also to be understood that, although a preferred embodiment of the control system of the present invention has been illustrated and described herein, the invention is not limited thereby, but is susceptible of changes in form and detail within the scope of the appended claims.

We claim:

1. In a system having a controlling element and a controlled element governed thereby, the combination of a motor connected to said controlled element, a reversing switch for controlling said motor and having two sets of contacts, operative connections between said controlling element and one set of said contacts, operative connections between said motor and the other set of said contacts, means interposed in the connections between the controlling element and said motor for regulating the operation of the latter, and means jointly responsive to the movements of the controlling and controlled elements for actuating said first means, said last-named means including series-opposed generators severally connected to said elements.

2. In a system having a controlling element and a controlled element governed thereby, the combination of a motor connected to said controlled element, a reversing switch for controlling said motor and having two sets of contacts, operative connections between said controlling element and one set of said contacts, operative connections between said motor and the other set of said contacts, means interposed in the connections between the controlling element and said motor for regulating the operation of the latter, a generator actuated by the controlling element, a generator actuated by the controlled element, and means responsive to the differential output of said generators for controlling said first means.

3. In a system having a controlling element and a controlled element governed thereby, the combination of a motor connected to said controlled element, a reversing switch for controlling said motor and having two sets of contacts, operative connections between said controlling element and one set of said contacts, operative connections between said motor and the other set of said contacts, means interposed in the connections between the controlling element and said motor for regulating the operation of the latter, a differential electrical transmitter actuated in accordance with positional disagreement between said elements, an electrical receiver therefor, and operative connections between said receiver and said means.

4. In a system having a controlling element and a controlled element governed thereby, the combination of a motor connected to said controlled element, a reversing switch for controlling said motor and having two sets of contacts, operative connections between said controlling element and one set of said contacts, operative connections between said motor and the other set of said contacts, means interposed in the connections between the controlling element and said motor for regulating the operation of the latter, a differential electrical transmission means actuated in accordance with positional disagreement between said elements for controlling said first means, and electrical means responsive to the magnitude of the differential velocity of said elements for modifying the operation of said transmission means.

5. In a system having a controlling element and a controlled element governed thereby, the combination of power means for driving said controlled element, a control member for controlling said power means, a control motor for said member, a reversing switch for controlling said control motor and having two sets of contacts, operative connections between said controlling element and one set of said contacts, operative connections between said control motor and the other of said sets of contacts, means responsive to a predetermined movement of the controlling element for regulating the operation of the reversing switch to vary the control of said member by said control motor, and means responsive to movement of said controlled element for modifying the regulation of said switch by said last named means.

6. In a system having a controlling element and a controlled element governed thereby, the combination of power means for driving said controlled element, a control member for controlling said power means, a control motor for said member, a reversing switch for controlling said control motor and having two sets of contacts, operative connections between said controlling element and one set of said contacts, operative connections between said control motor and the other of said sets of contacts, and means jointly responsive to movements of said elements for regulating the operation of the reversing switch to vary the control of said member by said control motor.

7. In a system having a controlling element and a controlled element governed thereby, the combination of power means for driving said controlled element, a control member for controlling said power means, a control motor for said member, a reversing switch for controlling said control motor and having two sets of contacts, operative connections between said controlling element and one set of said contacts, operative connections between said control motor and the other of said sets of contacts, and means jointly responsive to the movements of the controlling and controlled elements for regulating the operation of the reversing switch to vary the control of said member by said control motor.

8. In a system having a controlling element and a controlled element governed thereby, the combination of power means for driving said controlled element, a control member for controlling said power means, a control motor for said member, a reversing switch for controlling said control motor and having two sets of contacts, operative connections between said controlling element and one set of said contacts, operative connections between said control motor and the other of said sets of contacts, and differential means jointly responsive to the movements of said controlled and controlling elements for regulating the operation of said reversing switch to vary the control of said member by said control motor.

9. In a system having a controlling element and a controlled element governed thereby, the combination of power means for driving said controlled element, a control member for controlling said power means, a control motor for said member, a reversing switch for controlling said control motor and having two sets of contacts, operative connections between said controlling element and one set of said contacts, operative connections between said control motor and the other of said sets of contacts, and means responsive to the differential velocity of said controlled and controlling elements for regulating the operation of said reversing switch to vary the control of said member by said control motor.

10. In a system having a controlling element and a controlled element governed thereby, the combination of power means for driving said controlled element, a control member for controlling said power means, a control motor for said member, a reversing switch for controlling said control motor and having two sets of contacts, operative connections between said controlling element and one set of said contacts, operative connections between said control motor and the other of said sets of contacts, and means interposed in said first operative connections responsive to the differential velocity of said controlled and controlling elements for varying said first operative connections.

11. In a system having a controlling element and a controlled element governed thereby, the combination of power means for driving said controlled element, a control member for controlling said power means, a control motor for said member, a reversing switch for controlling said control motor and having two sets of contacts, operative connections between said controlling element and one set of said contacts, operative connections between said control motor and the other of said sets of contacts, said first operative connections including an electrical follow-up system, means responsive to positional disagreement between said elements for modifying the movement of said follow-up system to compensate for said disagreement, and means responsive to the differential velocity of said elements for further modifying the movement of said follow-up system.

12. In a system having a controlling element and a controlled element governed thereby, the combination of a variable-speed power means for driving said controlled element and having a control member, a reversible control motor, operative connections between said control motor and said member, a reversing switch for controlling said control motor and having two sets of contacts, operative connections between said control motor and one set of said contacts, a pilot motor, operative connections between said pilot motor and the other of said sets of contacts, means for controlling said pilot motor in accordance with the movements of said controlling element and including an electrical follow-up system, mechanism responsive to a positional disagreement between said controlling and controlled elements, means for modifying the movement of said pilot motor in accordance with the response of said mechanism to compensate for such disagreement, and means responsive to the differential velocity of said elements for modifying the movement of said follow-up system.

13. In a system having a controlling element and a controlled element governed thereby, the combination of a variable-speed power means for driving said controlled element and having a control member, a reversible control motor, operative connections between said control motor and said member, a reversing switch for controlling said control motor and having two sets of contacts, operative connections between said control motor and one set of said contacts, operative connections between said controlling element and said other set of contacts including an electrical transmission system, generators driven by said controlling and controlled elements for generating voltages proportional to speed, and means for modifying the operation of said transmission system with the differential of said voltages.

14. In a system having a controlling element and a controlled element governed thereby, the combination of a motor connected to the controlled element, a reversing switch for controlling said motor and having two sets of contacts, operative connections between said motor and one set of said contacts, operative connections between said controlling element and the other set of said contacts, said last-named connections including a pilot motor for actuating said other set of contacts, and a follow-up switch for controlling the same, having one part operated by said controlling element and a follow-up part operatively connected to said pilot motor and having limited freedom of movement, said last-named connections including a mechanical differential and an inertia brake therefor providing direct drive of said follow-up part from said pilot motor within the limits of its movement.

ARTHUR P. DAVIS.
GEORGE AGINS.

REFERENCES CITED

The following references are of record in the file of this patent:

UNITED STATES PATENTS

| Number | Name | Date |
|---|---|---|
| 2,015,183 | Hodgman | Sept. 24, 1935 |
| 1,749,842 | Pfretzschner | Mar. 11, 1930 |

FOREIGN PATENTS

| Number | Country | Date |
|---|---|---|
| 547,869 | French | Oct. 5, 1922 |
| 702,932 | French | Feb. 2, 1931 |
| 73,284 | Swedish | Dec. 15, 1931 |
| 812,451 | French | Feb. 1, 1937 |